July 11, 1933.  E. L. WOODSIDE  1,917,282
NAVIGATIONAL INSTRUMENT
Filed Nov. 3, 1931   2 Sheets-Sheet 1
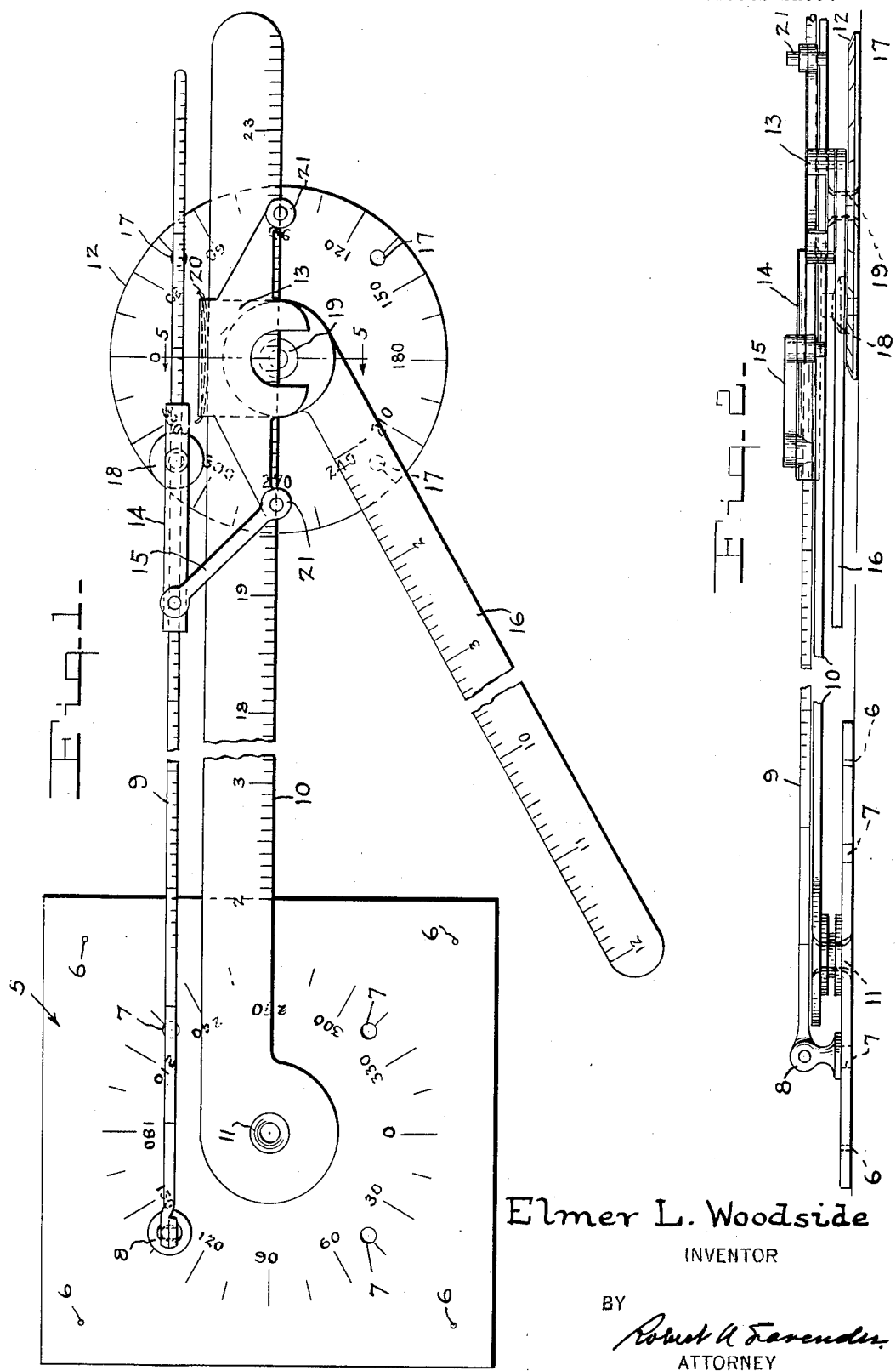
Elmer L. Woodside
INVENTOR
BY
ATTORNEY July 11, 1933.  E. L. WOODSIDE  1,917,282
NAVIGATIONAL INSTRUMENT
Filed Nov. 3, 1931  2 Sheets-Sheet 2
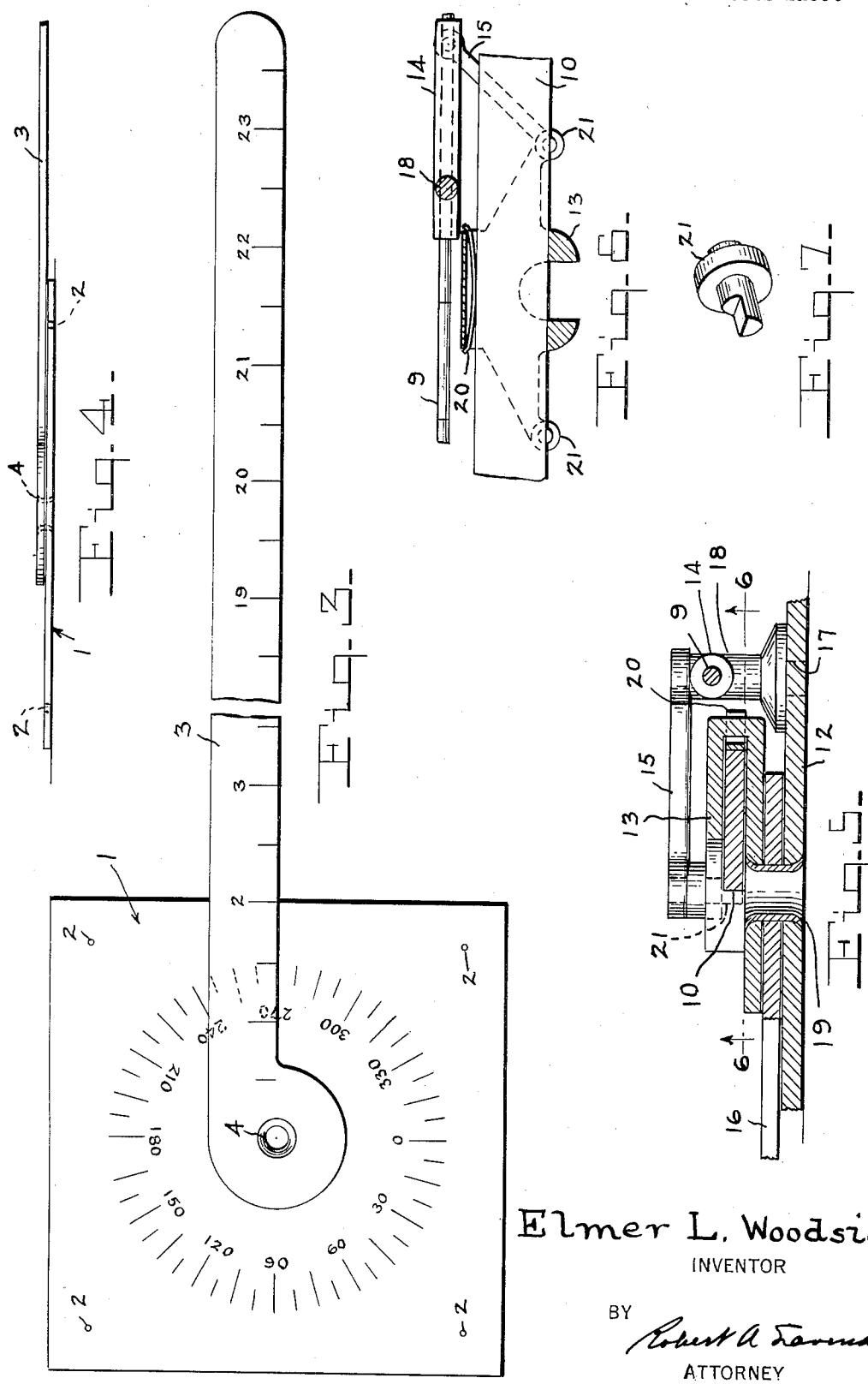
Elmer L. Woodside,
INVENTOR Patented July 11, 1933

1,917,282

UNITED STATES PATENT OFFICE

ELMER L. WOODSIDE, OF THE UNITED STATES NAVY

NAVIGATIONAL INSTRUMENT

Application filed November 3, 1931. Serial No. 572,805.

(GRANTED UNDER THE ACT OF MARCH 3, 1883, AS AMENDED APRIL 30, 1928; 370 O. G. 757)

This invention relates to navigational instruments and has for its objects: first, to provide facilities for quickly plotting the position of a ship approaching her anchorage; and second to provide facilities for quickly determining the course and distance from the plotted position to the anchorage.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 is a plan view of a protractor with course and distance attachment;

Fig. 2 is an elevation of the instrument shown in Fig. 1;

Fig. 3 is a plan view of one protractor of a position plotter;

Fig. 4 is an elevation of the protractor shown in Fig. 3;

Fig. 5 is a section 5—5 of the instrument shown in Fig. 1;

Fig. 6 is a view from below of part of the instrument shown in Fig. 5;

Fig. 7 is a perspective of one of the guide pins of Fig. 6.

In bringing a ship to anchor in an assigned berth, due to her slowness in responding to changes in course or speed, it is very important to be able to quickly plot the position of the ship at any instant and also to quickly determine the course and distance from the plotted position to the anchorage. The apparatus of this invention is designed to accomplish these requirements expeditiously.

The apparatus consists of several of the lighter protractors shown in Fig. 3 and one of the heavier protractors with the parallel motion mechanism, as shown in Fig. 1.

The light protractor of Figs. 3 and 4 consists of a substantially square piece of transparent celluloid 1 having a compass rose marked thereon in degrees from 0 to 360 and having four holes 2 through which it may be secured in a fixed position on the chart.

A graduated arm 3 is pivoted at the center of the compass rose and is so constructed that the extension of one edge passes through the center of the compass rose. Arm 3 is pivotally secured to piece 1 by a hollow rivet 4. The hole in 4 permits the centering of the compass rose over a fixed object on the chart. The scale on arm 3 may be in inches but it is preferable to have it in yards and according to the scale of the chart being used. In the latter case, when using charts of different scales, different protractors would have to be used. The arm 3 is made detachable so that one graduated to the scale of the chart in use may be fitted thereon.

The heavy protractor of Fig. 1 and Fig. 2 consists of a substantially square piece of transparent celluloid 5 having a compass rose marked thereon in degrees from 0 to 360 and having four holes 6 through which it may be secured in a fixed position on the chart. Piece 5 has four other holes 7, spaced 90° apart, whose centers are on a circle of radius "$r$", the center of the circle coinciding with the center of the compass rose. In the construction shown the holes are placed at 45°, 135°, 225° and 315° from the 0° line of the compass rose. Bar pivot support 8 fits snugly into any of holes 7 and pivotally supports one end of graduated bar 9. A graduated arm 10 is pivoted at the center of the compass rose and is so constructed that the extension of one edge passes through the center of the compass rose. Arm 10 is pivotally secured to piece 5 by a hollow rivet 11. The hole in 11 permits the centering of the compass rose over a fixed object on the chart. The scale on arm 10 may be in inches but it is preferable to have it in yards and according to the scale of the chart being used. In the latter case, when using charts of different scales different protractors would have to be used. The arm 10 may be made detachable so that an arm graduated to the proper scale of the chart in use could be fitted thereon.

The course and distance attachment for use with the heavy protractor consists of graduated bar 9, transparent celluloid disk 12, rose guide 13, guide tube 14, link 15 and graduated course and distance arm 16. The transparent celluloid disk 12 is graduated in degrees from 0 to 360 forming a compass rose, and has four holes 17, spaced 90° apart, whose centers are on a circle of radius "$r$", the center of the circle coinciding with the center of the compass rose. Holes 17 are located in corresponding positions to holes 7. The pivot support 18 of guide tube 14 fits snugly into any one of the holes 17. The graduated arm 16 is pivoted at the center of the compass rose on disk 12 and is so constructed that an extension of one edge passes through the center of the compass rose. Arm 16 is pivotally secured to disk 12 by a hollow rivet 19. The hole in 19 permits the centering of the compass rose over a plotted position on the chart. The scale on arm 16 may be in inches but it is preferable to have it in yards and according to the scale of the chart being used. In the latter case, when using charts of different scales, different course and distance attachments would have to be used. The arm 16 may be made detachable so that one graduated to the scale of the chart in use could be fitted thereon. The slide 13 is also pivoted at the center of disk 12 and held by rivet 19 and is adapted for the sliding of arm 10 therethrough. Spring 20 presses arm 10 against the opposite side of the slide passage and against the guide pins 21 so that one edge of arm 10 passes through the center of the compass rose on disk 12. This is seen more clearly from Fig. 6. Graduated bar 9 fits snugly but slidably in guide tube 14, whose graduated divisions are the same as those on arm 10. These graduations assist in checking the orientation of disk 12 relative to piece 5 and hence the chart, after it has been centered over a plotted position on the chart and before the course and distance to the anchorage is read off. This is done by observing that the left edge of guide tube 14 registers on the scale on bar 9 the same as the left edge of disk 12 registers on the scale on arm 10 and moving guide tube 14 as necessary if such is not true. Link 15, which is of length "$r$" between pivots, serves to strengthen the whole apparatus and prevent bending of bar 9. Also, the link 15 assures the parallel motion of disk 12 relative to piece 5 despite the fact that it is slidably mounted on arm 10 and bar 9. It is clear from the use of the apparatus that the course and distance attachment must be slidably mounted on bar 9 and arm 10 and that the course taken from disk 12 must be accurate. Therefore, after disk 12 has centered over the plotted position on the chart, its orientation can be quickly checked by observing the graduations on bar 9 and arm 10. As explained above, this is necessary because of the demand for accuracy and the fact that error might creep in due to the length of bar 9 and arm 10 or the giving of spring 20. Arm 16 in moving about its pivot, passes under arm 10 and bar 9 but due to pivot 18 cannot be moved through a complete circle. In case pivot 18 interferes with a part of disk 12 required for use, the pivots 8 and 18 are placed in corresponding other holes 7 and 17 and bar 9 moved accordingly.

In using the apparatus, three of the light protractors are centered respectively over three objects on the chart selected for observing bearings. They are oriented with the marks 0° and 180° on the protractor corresponding respectively to 180° and 0° on the chart, so that the reverse bearings of the objects may plotted on the chart by setting the arms of the protractors to the observed bearing. This eliminates the mental calculation of adding or substracting 180° to or from the direct bearing. The heavy protractor with its course and distance attachment is similarly oriented at some convenient point on the chart. Simultaneous bearings of the three fixed objects are then observed and set on their corresponding protractors. These should intersect at a point giving the position of the ship. In case they do not intersect at a point but form a triangle, the center of that triangle is marked. The course and distance attachment on the heavier protractor is then moved along its arm until it is centered over this position. The orientation of compass rose 12 is then checked as described above and the course and distance arm 16 rotated until the working edge passes through the center of the assigned berth or other point at which it is desired to anchor. The course is then read off the compass rose 12 as indicated by the working edge of arm 16 and the distance is read off arm 16.

The heavy protractor may be used in place of one of the light protractors by merely sliding the course and distance attachment clear while using arm 10 for plotting.

It will be understood that the above description and accompanying drawings comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

I claim:

1. A navigational instrument comprising a piece of transparent material upon which is marked a compass rose, a first graduated arm pivoted at the center of the compass rose, a graduated bar pivoted on said piece at a distance "$r$" from the center of the compass rose, a slide mounted on said first arm, a transparent disk upon which is marked a second compass rose, said disk being pivoted on said slide at the center of the said second compass rose, a guide tube slidably mounted on said bar and pivoted on said disk at a distance "*r*" from its center, a link pivoted on said guide tube and said slide equidistant from said guide tube and slide pivots, the length of said link between pivots being "*r*", and a second graduated arm pivoted at the center of the said second compass rose of said disk.

2. A navigational instrument comprising a piece of transparent material upon which is marked a compass rose, an arm pivoted at the center of said compass rose, a bar pivoted on said piece at a distance "*r*" from the center of the compass rose, a course and distance attachment slidably mounted on said arm and bar, and means for maintaining the course attachment oriented with respect to the compass rose of said piece while said arm and bar are revolved about their pivots and said course attachment is moved along said arm and bar.

3. A navigational instrument comprising a piece of transparent material upon which is marked a compass rose, a first arm pivoted at the center of said compass rose, a second arm pivoted on said piece at a distance "*r*" from the center of the compass rose, a guide slidably mounted on each of said arms, a disk upon which is marked a second compass rose, said second compass rose being oriented 180 degrees with respect to the first compass rose, the guide on said first arm being pivoted at the center of said second compass rose, the guide on said second arm being pivoted on said disk at a distance "*r*" from the center of said second compass rose, a link pivoted on said guides equally distant from the above mentioned guide pivots, the length of said link between pivots being "*r*", and a graduated arm pivoted at the center of the compass rose of said disk.

4. A navigational instrument comprising a piece of transparent material upon which is marked a compass rose, a first arm pivoted at the center of said compass rose, a second arm adapted to be pivoted on said piece at a plurality of locations each at a distance "*r*" from the center of the compass rose, a guide slidably mounted on each of said arms, a disk upon which is marked a second compass rose, the guide on said first arm being pivoted at the center of said second compass rose, the guide on said second arm adapted to be pivoted on said disk at a plurality of predetermined locations each at a distance "*r*" from the center of said second compass rose and corresponding to said first plurality of predetermined locations, a link pivoted on said guides equally distant from the guide pivots, the length of said link between pivots being "*r*", and a graduated arm pivoted at the center of the compass rose of said disk.

5. A navigational instrument comprising a piece of transparent material upon which is marked a first compass rose, a first graduated arm pivoted at the center of the compass rose, an extension of one edge of said first arm passing through the center of the first compass rose, a graduated bar pivoted on said piece at a distance "*r*" from the center of the first compass rose, a slide mounted on said first arm, a disk of transparent material upon which is marked a second compass rose, said disk being pivoted on said slide at the center of the second compass rose, one edge of said arm as it moves through the slide always passing through the center of the second compass rose, a guide tube slidably mounted on said bar and pivoted on said disk at a distance "*r*" from the center of the second compass rose, a link pivoted on said guide tube and said slide at points equidistant from the above mentioned guide tube and slide pivots, the length of said link between pivots being "*r*", and a second graduated arm pivoted at the center of the second compass rose, an extension of one edge of said second arm passing through the center of the second compass rose.

ELMER L. WOODSIDE.